United States Patent
Yang et al.

(10) Patent No.: US 11,270,442 B2
(45) Date of Patent: Mar. 8, 2022

(54) MOTION IMAGE INTEGRATION METHOD AND MOTION IMAGE INTEGRATION SYSTEM CAPABLE OF MERGING MOTION OBJECT IMAGES

(71) Applicant: Realtek Semiconductor Corp., HsinChu (TW)

(72) Inventors: Chao-Hsun Yang, New Taipei (TW); Shang-Lun Chan, Hsinchu (TW); Chun-Chang Wu, Taichung (TW); Shih-Tse Chen, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 155 days.

(21) Appl. No.: 16/745,258

(22) Filed: Jan. 16, 2020

(65) Prior Publication Data

US 2021/0074002 A1 Mar. 11, 2021

(30) Foreign Application Priority Data

Sep. 6, 2019 (TW) ................................ 108132251

(51) Int. Cl.
*G06T 7/215* (2017.01)
*G06T 7/246* (2017.01)

(52) U.S. Cl.
CPC .............. *G06T 7/215* (2017.01); *G06T 7/246* (2017.01); *G06T 2207/20221* (2013.01)

(58) Field of Classification Search
CPC ................ G06T 7/20–292; G06T 2207/20221
See application file for complete search history.

(56) References Cited

U.S. PATENT DOCUMENTS

| | | | | |
|---|---|---|---|---|
| 10,319,099 | B2 * | 6/2019 | Tsunashima | ....... G06K 9/00771 |
| 11,039,044 | B2 * | 6/2021 | Kniffen | ................... G06T 7/248 |
| 2006/0159370 | A1 * | 7/2006 | Tanaka | ................... G06T 7/246 |
| | | | | 382/305 |
| 2009/0208062 | A1 * | 8/2009 | Sorek | ................ H04N 5/23229 |
| | | | | 382/107 |
| 2013/0156269 | A1 * | 6/2013 | Matsui | ..................... G06T 7/20 |
| | | | | 382/107 |
| 2014/0098996 | A1 * | 4/2014 | Fujimatsu | ............... G06T 7/254 |
| | | | | 382/103 |

(Continued)

FOREIGN PATENT DOCUMENTS

| | | |
|---|---|---|
| CN | 102467738 A | 5/2012 |
| CN | 108230245 A | 6/2018 |

*Primary Examiner* — Sean T Motsinger
(74) *Attorney, Agent, or Firm* — Winston Hsu

(57) ABSTRACT

A motion image integration method includes acquiring a raw image, detecting a first motion region image and a second motion region image by using a motion detector according to the raw image, merging the first motion region image with the second motion region image for generating a motion object image according to a relative position between the first motion region image and the second motion region image, and cropping the raw image to generate a sub-image corresponding to the motion object image according to the motion object image. A range of the motion object image is greater than or equal to a total range of the first motion region image and the second motion region image. Shapes of the first motion region image, the second motion region image, and the motion object image are polygonal shapes.

18 Claims, 9 Drawing Sheets

(56) References Cited

U.S. PATENT DOCUMENTS

| | | | |
|---|---|---|---|
| 2016/0140392 A1* | 5/2016 | Gurbuz | G06K 9/00624 |
| | | | 382/103 |
| 2017/0083766 A1* | 3/2017 | Risinger | G06T 7/246 |
| 2018/0121736 A1* | 5/2018 | Tsunashima | H04N 7/18 |
| 2019/0088005 A1* | 3/2019 | Lucas | G06T 7/246 |
| 2019/0130582 A1* | 5/2019 | Cheng | G06T 7/248 |
| 2020/0250832 A1* | 8/2020 | Li | G06T 7/246 |
| 2020/0404174 A1* | 12/2020 | Taxbol | H04N 5/247 |
| 2021/0027496 A1* | 1/2021 | Koyama | G06T 7/73 |
| 2021/0074001 A1* | 3/2021 | Chan | G06T 7/70 |
| 2021/0074002 A1* | 3/2021 | Yang | G06T 7/246 |

* cited by examiner

MOTION IMAGE INTEGRATION METHOD AND MOTION IMAGE INTEGRATION SYSTEM CAPABLE OF MERGING MOTION OBJECT IMAGES

BACKGROUND OF THE INVENTION

1. Field of the Invention

The present disclosure illustrates a motion image integration method and a motion image integration system, and more particularly, a motion image integration method and a motion image integration system capable of merging motion object images for enhancing motion detection accuracy.

2. Description of the Prior Art

With advancements of technologies, consumer products having video surveillance functions can provide a cloud identification function. For example, a smartphone or a webcam can be used for monitoring surrounding environment by accessing cloud computing resources through a network. Since the smartphone or the webcam can transmit image data to a cloud server for performing the cloud identification function, when the cloud identification function is enabled, a data transmission bandwidth and a resolution of the image are relevant to processing time and hardware computational complexity of the cloud server.

In current technologies of the cloud identification function, high-resolution images can be used for enhancing identification accuracy. However, a lot of data transmission costs and computing resources are also required for processing the high-resolution images. In other words, since the cloud server has to receive the image data through the network, when the transmission bandwidth of the image data increases or unexpected network congestion occurs, the cloud server has to reallocate its hardware resources for enhancing data communications. Therefore, the cloud server may fail to execute a real-time cloud identification function. Further, when the cloud identification function is used for identifying motion objects (i.e., say, performing "a motion detection/identification function"), if only a small part of a motion object image is detected, it results in an identification failure or an identification invalidation due to insufficient image integrity. Moreover, when the cloud server fails to identify the motion object, the cloud server may repeatedly try to identify the same motion object by executing its identification loops, thereby leading to increased processing time.

SUMMARY OF THE INVENTION

In an embodiment of the present disclosure, a motion image integration method is disclosed. The motion image integration method comprises acquiring a raw image, detecting a first motion region image and a second motion region image by using a motion detector according to the raw image, merging the first motion region image with the second motion region image for generating a motion object image according to a relative position between the first motion region image and the second motion region image, and cropping the raw image to generate a sub-image corresponding to the motion object image according to the motion object image. A range of the motion object image is greater than or equal to a total range of the first motion region image and the second motion region image. Shapes of the first motion region image, the second motion region image, and the motion object image are polygonal shapes.

In another embodiment of the present disclosure, a motion image integration system is disclosed. The motion image integration system comprises an image capturing device, a motion detector, a memory, and a processor. The image capturing device is configured to acquire a raw image. The motion detector is coupled to the image capturing device. The memory is configured to save image data. The processor is coupled to the image capturing device, the motion detector, and the memory. After the motion detector receives the raw image transmitted from the image capturing device, the motion detector detects a first motion region image and a second motion region image according to the raw image. The memory saves the first motion region image and the second motion region image. The processor merges the first motion region image with the second motion region image for generating a motion object image according to a relative position between the first motion region image and the second motion region image. The processor crops the raw image to generate a sub-image corresponding to the motion object image according to the motion object image. A range of the motion object image is greater than or equal to a total range of the first motion region image and the second motion region image. Shapes of the first motion region image, the second motion region image, and the motion object image are polygonal shapes.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
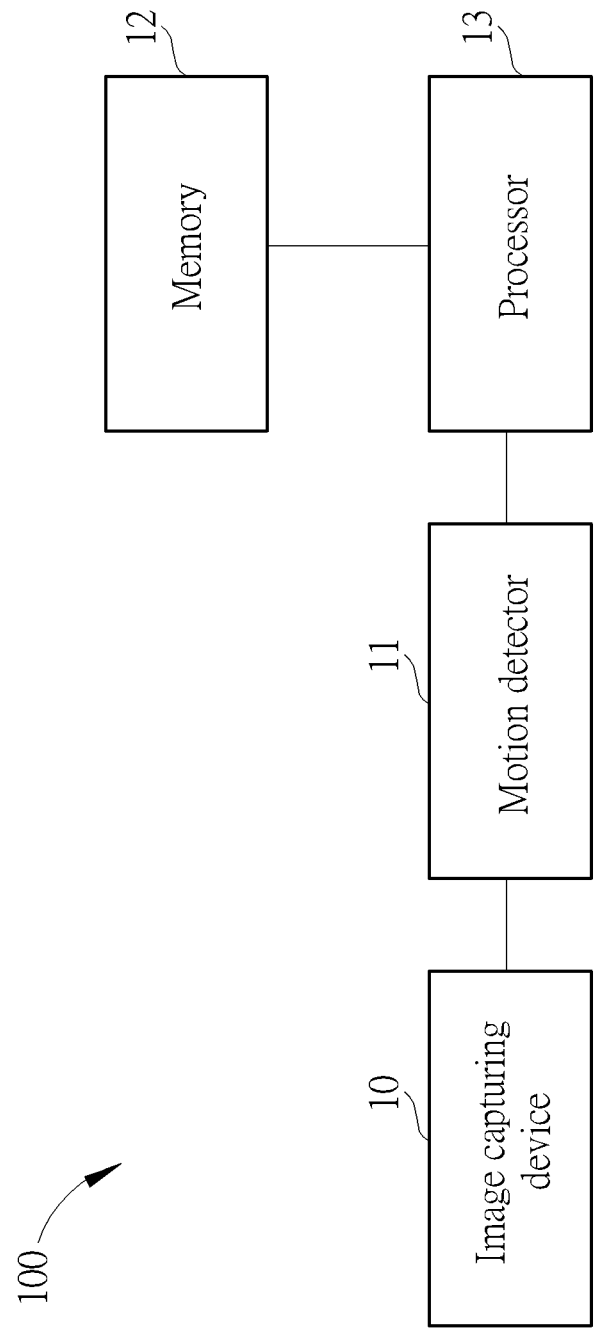
FIG. 1 is a block diagram of a motion image integration system according to an embodiment of the present disclosure.

FIG. 1 is a block diagram of a motion image integration system 100 according to an embodiment of the present disclosure. The motion image integration system 100 includes an image capturing device 10, a motion detector 11, a memory 12, and a processor 13. The image capturing device 10 is used for acquiring a raw image. The image capturing device 10 can be any device having a photosensitive function, such as a camera or a video recorder. The motion detector 11 is coupled to the image capturing device 10. The motion detector 11 can detect the motion object image according to the raw image by using a frame difference process. The frame difference process can collect two or more continuous image frames for checking if coordinates of image objects are shifted among these continuous image frames. Therefore, the frame difference process can detect a presence of the motion object image. The motion detector 11 can detect the motion object image according to the raw image by using a background modeling process. The background modeling process can use a plurality of image frames for generating background model images including fixed objects. Then, the background modeling process can detect color tone differences of the background model images for determining a presence and a range of the motion object image. However, the motion detector 11 is not limited to a specific technology for detecting the motion object. The memory 12 is used for saving image data. The memory 12 can be a hard disk, a random access memory, a flash memory, or any data buffering device. The processor 13 is coupled to the motion detector 11 and the memory 12. In the motion image integration system 100, after the motion detector 11 receives the raw image transmitted from the image capturing device 10, the motion detector 11 can detect a first motion region image and a second motion region image according to the raw image. The memory 12 can save the first motion region image and the second motion region image through the processor 13. For enhancing the image identification efficiency, the processor 13 can optionally merge the first motion region image with the second motion region image for generating a motion object image according to a relative position between the first motion region image and the second motion region image. A range of the motion object image is greater than or equal to a total range of the first motion region image and the second motion region image. Then, the processor 13 can crop the raw image to generate a sub-image corresponding to the motion object image according to the motion object image. Finally, the processor 13 can generate a detection result according to the sub-image. In the motion image integration system 100, shapes of the first motion region image, the second motion region image, and the motion object image can be polygonal shapes, such as rectangular shapes. A motion image integration method performed by the motion image integration system 100 is illustrated below.

Figure 2:
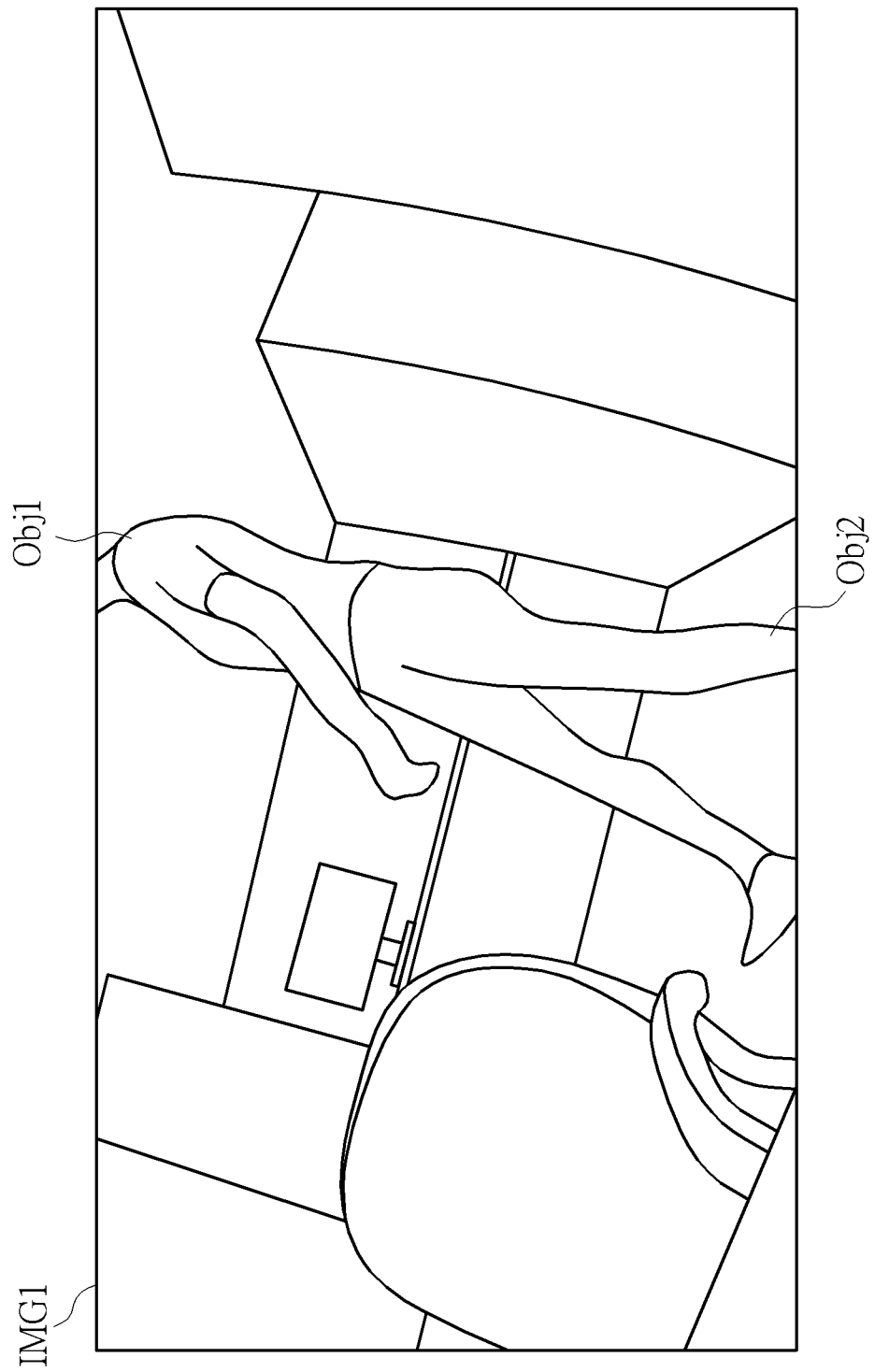
FIG. 2 is an illustration of detecting a motion object from a raw image by using a motion detector of the motion image integration system in FIG. 1.

FIG. 2 is an illustration of detecting a motion object from the raw image IMG1 by using the motion detector 11 of the motion image integration system 100. In the motion image integration system 100, the image capturing device 10 can generate the raw image IMG1. The raw image IMG1 can include at least one motion object and at least one non-motion object. For example, in FIG. 2, the raw image IMG1 corresponds to a scene of an office. A person walking around the office can be regarded as a motion object. Fixed tables and chairs in the office can be regarded as non-motion objects. However, when the person is walking, swing amplitude variations and color tone variations of all limbs are different. Therefore, the motion detector 11 may not be able to detect a "complete" humanoid image. For example, when the person is walking, swing amplitude variations and color tone variations of an upper body and hands are particularly obvious. Therefore, the motion detector 11 can detect that a first motion object Obj1 includes the upper body and the hands. Further, when the person is walking, swing amplitude variations and color tone variations of calves are also obvious. Therefore, the motion detector 11 can detect that a second motion object Obj2 includes the calves. However, when the person is walking, swing amplitude variations and color tone variations of thighs are unobvious. Therefore, the motion detector 11 determines that the thighs of the person are non-motion objects. In other words, although the raw image IMG1 includes a walking person image, the motion detector 11 can only detect several "partial" images of the walking person image since the swing amplitude variations and the color tone variations of all limbs are different. For example, an image of the first motion object Obj1 including the upper body and the hands can be regarded as a partial image of the walking person image. An image of the second motion object Obj2 including the calves can be regarded as a partial image of the walking person image. In the motion image integration system 100, in order to avoid executing unnecessary identification loops, at least two motion region images (i.e., the first motion object Obj1 and the second motion object Obj2) can be jointly processed. Details are illustrated below.

Figure 3:
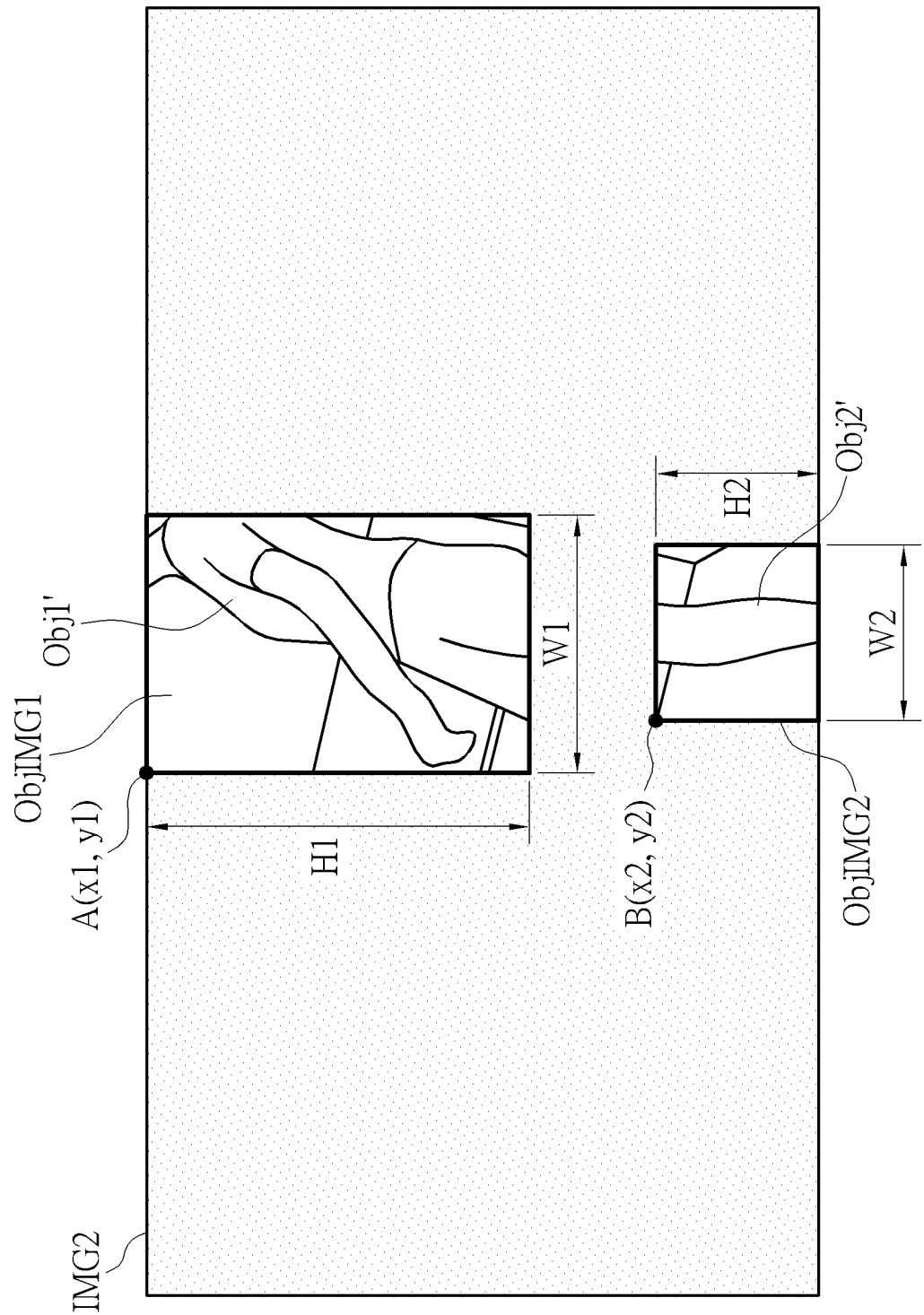
FIG. 3 is an illustration of generating a motion detection image including a first motion region image and a second motion region image by using the motion detector of the motion image integration system in FIG. 1.

FIG. 3 is an illustration of generating a motion detection image IMG2 including a first motion region image ObjIMG1 and a second motion region image ObjIMG2 by using the motion detector 11 of the motion image integration system 100. In practice, the processor 13 can apply dual gray levels to the raw image IMG1 for generating the motion detection image IMG2, as illustrated below. After the motion detector 11 receives the raw image IMG1 transmitted from the image capturing device 10, the motion detector 11 can partition the raw image IMG1 into the first motion region image ObjIMG1, the second motion region image ObjIMG2, and a background image. The first motion region image ObjIMG1 includes the first motion object Obj1 (i.e., for avoiding ambiguity, the first motion object Obj1 is called as a first motion object Obj1' in FIG. 3). The second motion region image ObjIMG2 includes the second motion object Obj2 (i.e., for avoiding ambiguity, the second motion object Obj2 is called as a second motion object Obj2' in FIG. 3). Further, the first motion region image ObjIMG1 and the second motion region image ObjIMG2 belong to two foreground images. Then, the processor 13 can apply dual gray levels to the first motion region image ObjIMG1, the second motion region image ObjIMG2, and the background image. For example, the first motion region image ObjIMG1 and the second motion region image ObjIMG2 (i.e., foreground images in FIG. 3) have a first gray level, such as a white color. The background image in FIG. 3 has a second gray level, such as a black color. In FIG. 3, since the background image of the motion detection image IMG2 has a single gray level (black), color details of the background image can be masked. However, the motion detector 11 is not limited to using the dual gray levels for generating the motion detection image IMG2 by partitioning the raw image IMG1 into the foreground images and the background image. Any reasonable technology of generating the motion detection image IMG2 falls into the scope of the present disclosure. Further, boundaries of the first motion region image ObjIMG1 and the second motion region image ObjIMG2 can be determined according to contours of the first motion object Obj1' and the second motion object Obj2'. For example, if the first motion object Obj1' has a large size, a range of the first motion region image ObjIMG1 determined by the motion detector 11 would be large. If the second motion object Obj2' has a small size, a range of the second motion region image ObjIMG2 determined by the motion detector 11 would be small.

Further, the motion detection system 100 can use the memory 12 for saving the image data. The image data can be digital image data. For example, a range and a position of the first motion region image ObjIMG1 and the second motion region image ObjIMG2 can be digitized as the image data, as illustrated below. In FIG. 3, the processor 13 can acquire two-dimensional coordinates of a vertex of a rectangular range of the first motion region image ObjIMG1, such as coordinates A(x1, y1) of an upper-left vertex A. Further, the processor 13 can acquire a width W1 of the rectangular range and a height H1 of the rectangular range of the first motion region image ObjIMG1. In other words, the position and the rectangular range of the first motion region image ObjIMG1 can be digitized as the image data including the coordinates A(x1, y1) of the upper-left vertex A, the width W1, and the height H1. Similarly, the processor 13 can acquire two-dimensional coordinates of a vertex of a rectangular range of the second motion region image ObjIMG2, such as coordinates B(x2, y2) of an upper-left vertex B. Further, the processor 13 can acquire a width W2 of the rectangular range and a height H2 of the rectangular range of the second motion region image ObjIMG2. In other words, the position and the rectangular range of the second motion region image ObjIMG2 can be digitized as the image data including the coordinates B(x2, y2) of the upper-left vertex B, the width W2, and the height H2. All digitized image data can be saved in the memory 12.

Figure 4:
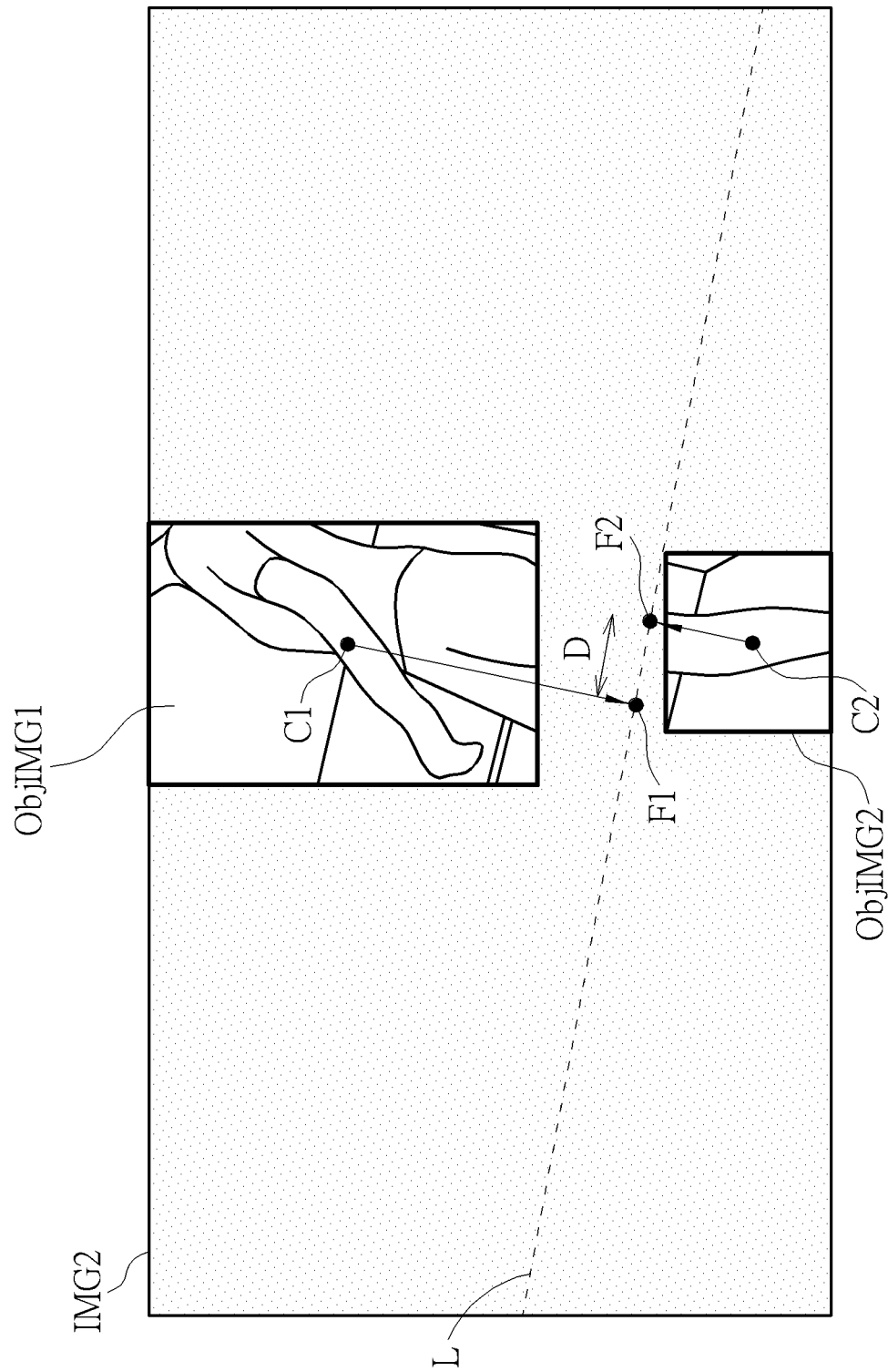
FIG. 4 is an illustration of determining if the first motion region image and the second motion region are merged by using the motion image integration system in FIG. 1.

FIG. 4 is an illustration of determining if the first motion region image ObjIMG1 and the second motion region ObjIMG2 are merged by using the motion image integration system 100. First, the processor 13 can acquire a baseline L. The baseline L can be a horizontal line or a vertical line of a surface. Then, the processor 13 can acquire a first center point C1 of the first motion region image ObjIMG1. The processor 13 can acquire a second center point C2 of the second motion region image ObjIMG2. Further, the processor 13 can acquire a first foot of perpendicular F1 on the baseline L according to the first center point C1. The processor 13 can acquire a second foot of perpendicular F2 on the baseline L according to the second center point C2. Then, the processor 13 can acquire a distance D between the first foot of perpendicular F1 and the second foot of perpendicular F2. Further, the processor 13 can determine the relative position between the first motion region image ObjIMG1 and the second motion region image ObjIMG2 according to the distance D between the first foot of perpendicular F1 and the second foot of perpendicular F2. In other words, the relative position between the first motion region image ObjIMG1 and the second motion region image ObjIMG2 can be quantized as the distance D. In FIG. 4, when the distance D between the first foot of perpendicular F1 and the second foot of perpendicular F2 is large, it implies that a dispersion between the first motion region image ObjIMG1 and the second motion region image ObjIMG2 is large. When the distance D between the first foot of perpendicular F1 and the second foot of perpendicular F2 is small, it implies that a dispersion between the first motion region image ObjIMG1 and the second motion region image ObjIMG2 is small.

In order to determine if the first motion region image ObjIMG1 and the second motion region image ObjIMG2 belong to two image parts of a motion object, the processor 13 can set a threshold. The threshold can be a user-defined value associated with an aspect ratio or a resolution of the raw image IMG1. For example, when the resolution of the raw image IMG1 is M×N pixels (M and M are positive integers), the threshold can be set as a value within a range from N/32 to N/16 for detecting a humanoid image. The processor 13 can optionally merge the first motion region image ObjIMG1 with the second motion region image ObjIMG2 according to the distance D between the first foot of perpendicular F1 and the second foot of perpendicular F2. In other words, when the distance D between the first foot of perpendicular F1 and the second foot of perpendicular F2 is smaller than or equal to the threshold, it implies that the first motion region image ObjIMG1 and the second motion region image ObjIMG2 belong to two image parts of a motion object. Therefore, the processor 13 can generate the motion object image including the motion object by merging the first motion region image ObjIMG1 with the second motion region image ObjIMG2. Conversely, when the distance D between the first foot of perpendicular F1 and the second foot of perpendicular F2 is greater than the threshold, it implies that the first motion region image ObjIMG1 and the second motion region image ObjIMG2 belong to two different motion objects. Therefore, the processor 13 can separately recognize the first motion region image ObjIMG1 and the second motion region image ObjIMG2.

Figure 5:
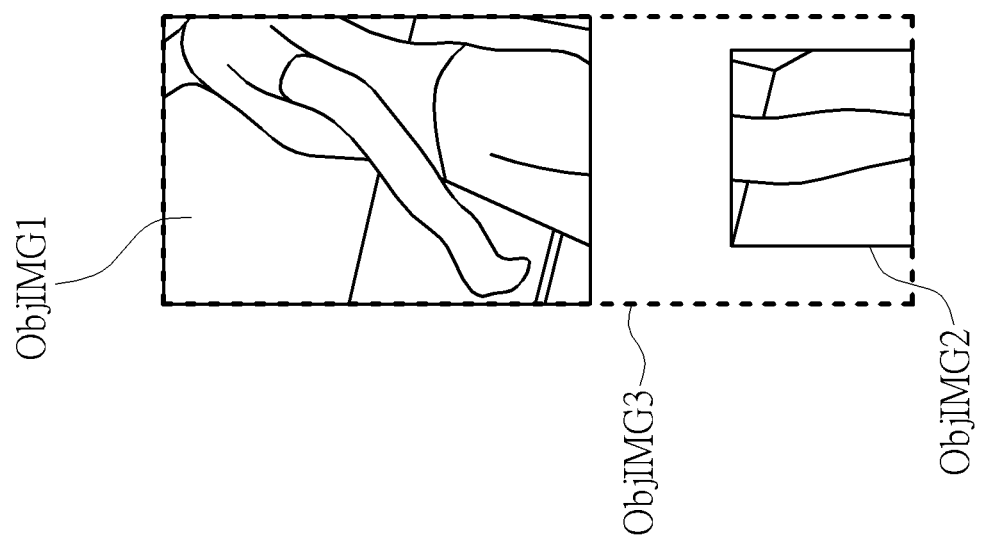
FIG. 5 is an illustration of acquiring a range of the motion object image by merging the first motion region image with the second motion region image in the motion image integration system in FIG. 1.

FIG. 5 is an illustration of acquiring a range of the motion object image ObjIMG3 by merging the first motion region image ObjIMG1 with the second motion region image ObjIMG2 in the motion image integration system 100. As previously mentioned, when the distance D between the first foot of perpendicular F1 and the second foot of perpendicular F2 is smaller than or equal to the threshold, the first motion region image ObjIMG1 and the second motion region image ObjIMG2 can be merged to generate the motion object image ObjIMG3 by the processor 13. Therefore, the range of the motion object image ObjIMG3 can include a range of the first motion region image ObjIMG1 and a range of the second motion region image ObjIMG2. Further, when the distance D is greater than zero, the range of the motion object image ObjIMG3 is greater than the total range of the first motion region image ObjIMG1 and the second motion region image ObjIMG2. Therefore, in subsequent processes of cropping the raw image IMG1 according to the range of the motion object image ObjIMG3, since additional pixel information can be introduced for connecting the first motion region image ObjIMG1 with the second motion region image ObjIMG2, the motion object detection efficiency and the motion object identification efficiency can be increased. Details of determining the range of the motion object image ObjIMG3 are illustrated below.

Figure 6:
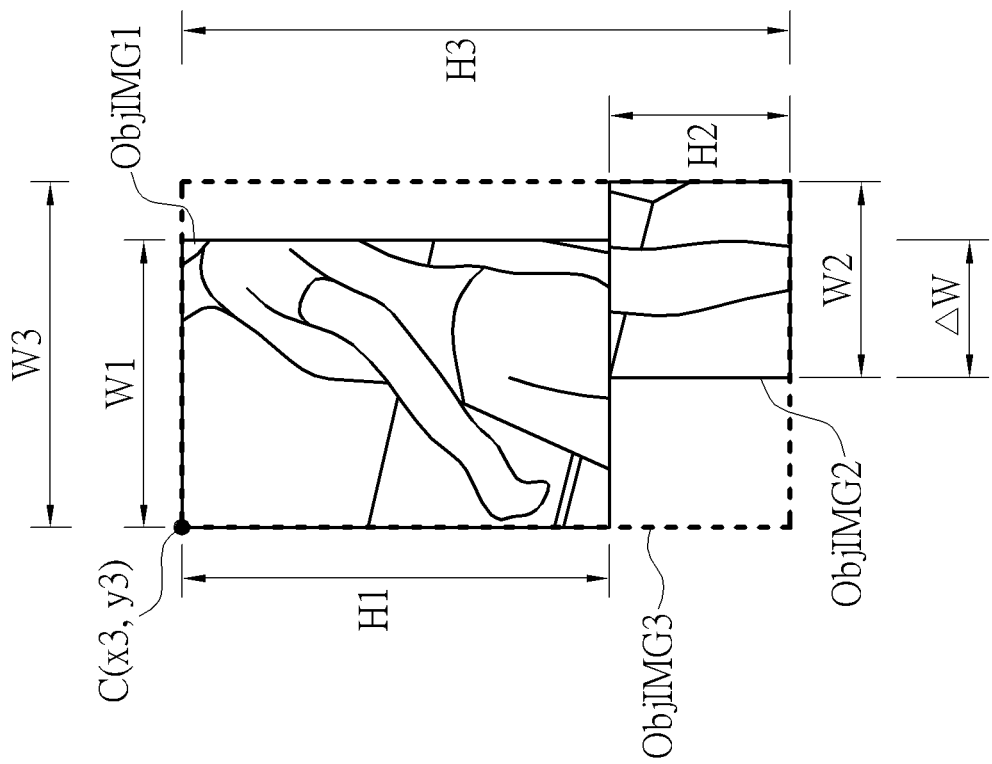
FIG. 6 is an illustration of a first mode of merging the first motion region image with the second motion region image in the motion image integration system in FIG. 1.
Figure 7:
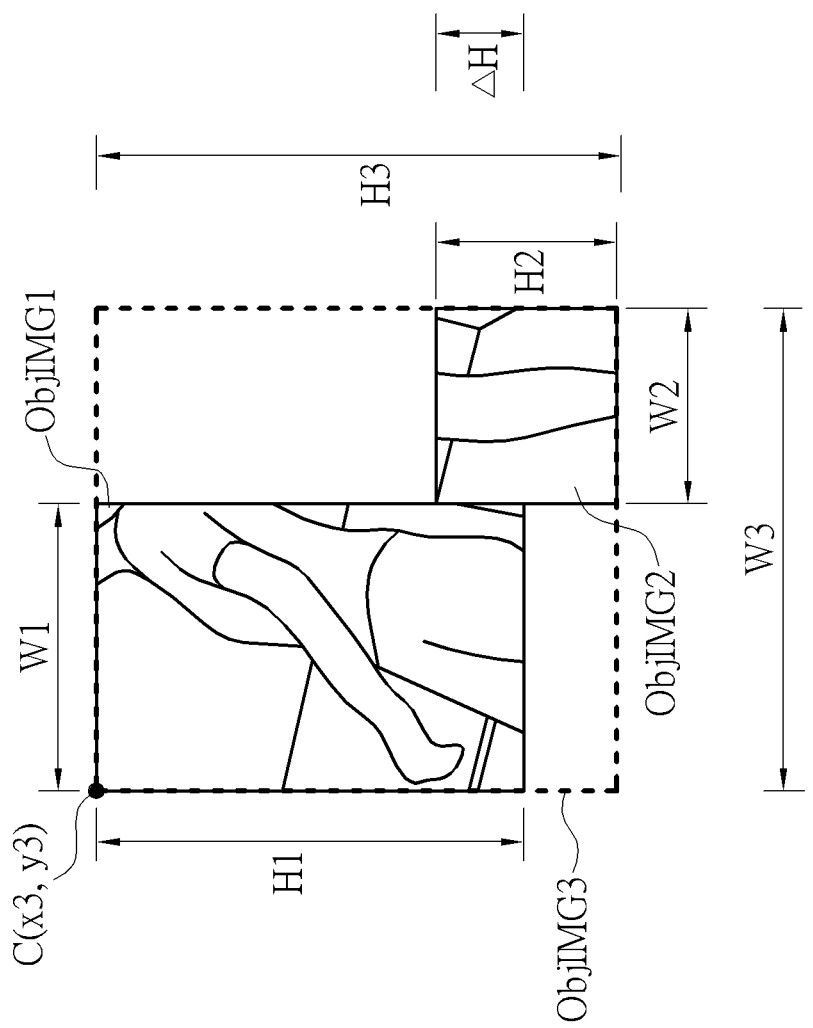
FIG. 7 is an illustration of a second mode of merging the first motion region image with the second motion region image in the motion image integration system in FIG. 1.

FIG. 6 is an illustration of a first mode of merging the first motion region image ObjIMG1 with the second motion region image ObjIMG2 in the motion image integration system 100. FIG. 7 is an illustration of a second mode of merging the first motion region image ObjIMG1 with the second motion region image ObjIMG2 in the motion image integration system 100. Here, positions of the first motion region image ObjIMG1 and the second motion region image ObjIMG2 may be shifted due to a motion velocity difference, an image shaking effect, or any timing difference of detection. A decision rule of determining the range of the motion object image ObjIMG3 is to "maximize" an amount of possible pixels (i.e., or say, maximize a selected image range) of the motion object according to the first motion region image ObjIMG1 and the second motion region image ObjIMG2. For example, in FIG. 6, the first motion region image ObjIMG1 is a rectangular image having a width W1 and a height H1. The second motion region image ObjIMG2 is a rectangular image having a width W2 and a height H2. When a first overlapping width ΔW is present on a first axis (i.e., an X-axis) between the first motion region image ObjIMG1 and the second motion region image ObjIMG2, the processor 13 can acquire a length W3 of the motion object image ObjIMG3 on the first axis by subtracting the first overlapping width ΔW from a total width (W1+W2) of the first motion region image ObjIMG1 and the second motion region image ObjIMG2 on the first axis. In other words, the motion object image ObjIMG3 in FIG. 6 is a rectangular image having a width W3=W1+W2−ΔW and a height H3=H1+H2. Further, as mentioned in FIG. 3, when the coordinates of the upper-left vertex A of the first region image ObjIMG1 is denoted as A(x1, y1) and the coordinates of the upper-left vertex B of the second region image ObjIMG2 is denoted as B(x2, y2), coordinates of an upper-left vertex C of the motion object image ObjIMG3 in FIG. 6 can be expressed as C(x3, y3)=(min{x1, x2}, max{y1, y2}).

Similarly, in FIG. 7, the first motion region image ObjIMG1 is a rectangular image having a width W1 and a height H1. The second motion region image ObjIMG2 is a rectangular image having a width W2 and a height H2. When a second overlapping height ΔH is present on a second axis (i.e., a Y-axis) between the first motion region image ObjIMG1 and the second motion region image ObjIMG2, the processor 13 can acquire a height H3 of the motion object image ObjIMG3 on the second axis by subtracting the second overlapping height ΔH from a total height (H1+H2) of the first motion region image ObjIMG1 and the second motion region image ObjIMG2 on the second axis. In other words, the motion object image ObjIMG3 in FIG. 6 is a rectangular image having a width W3=W1+W2−ΔW and a height H3=H1+H2−ΔH. Further, as mentioned in FIG. 3, when the coordinates of the upper-left vertex A of the first region image ObjIMG1 are denoted as A(x1, y1) and the coordinates of the upper-left vertex B of the second region image ObjIMG2 are denoted as B(x2, y2), coordinates of an upper-left vertex C of the motion object image ObjIMG3 in FIG. 6 can be expressed as C(x3, y3)=(min{x1, x2}, max{y1, y2}).

Therefore, according to FIG. 6 and FIG. 7, general conditions of the first motion region image ObjIMG1, the second motion region image ObjIMG2, and the motion object image ObjIMG3 can be written as below. The first motion region image ObjIMG1 is the rectangular image having the width W1 and the height H1. The coordinates of the upper-left vertex A of the first region image ObjIMG1 are denoted as A (x1, y1). The second motion region image ObjIMG2 is the rectangular image having the width W2 and the height H2. The coordinates of the upper-left vertex B of the second region image ObjIMG2 are denoted as B(x1, y1). The first overlapping width ΔW is present on the first axis (i.e., the X-axis) between the first motion region image ObjIMG1 and the second motion region image ObjIMG2. The second overlapping length ΔH is present on the second axis (i.e., the Y-axis) between the first motion region image ObjIMG1 and the second motion region image ObjIMG2. After the motion object image ObjIMG3 is generated by merging the first region image ObjIMG1 with the second motion region image ObjIMG2, the motion object image ObjIMG3 has the following characteristics:

1. The coordinates of the upper-left vertex C of the motion object image ObjIMG3 can be expressed as C(x3, y3)=(min{x1, x2}, max{y1, y2}).
2. The width of the motion object image ObjIMG3 can be expressed as W3=W1+W2−ΔW.
3. The height of the motion object image ObjIMG3 can be expressed as H3=H1+H2−ΔH.

Further, data of the coordinates C(x3, y3), the width W3, and the height H3 can be saved in the memory 12.

Figure 8:
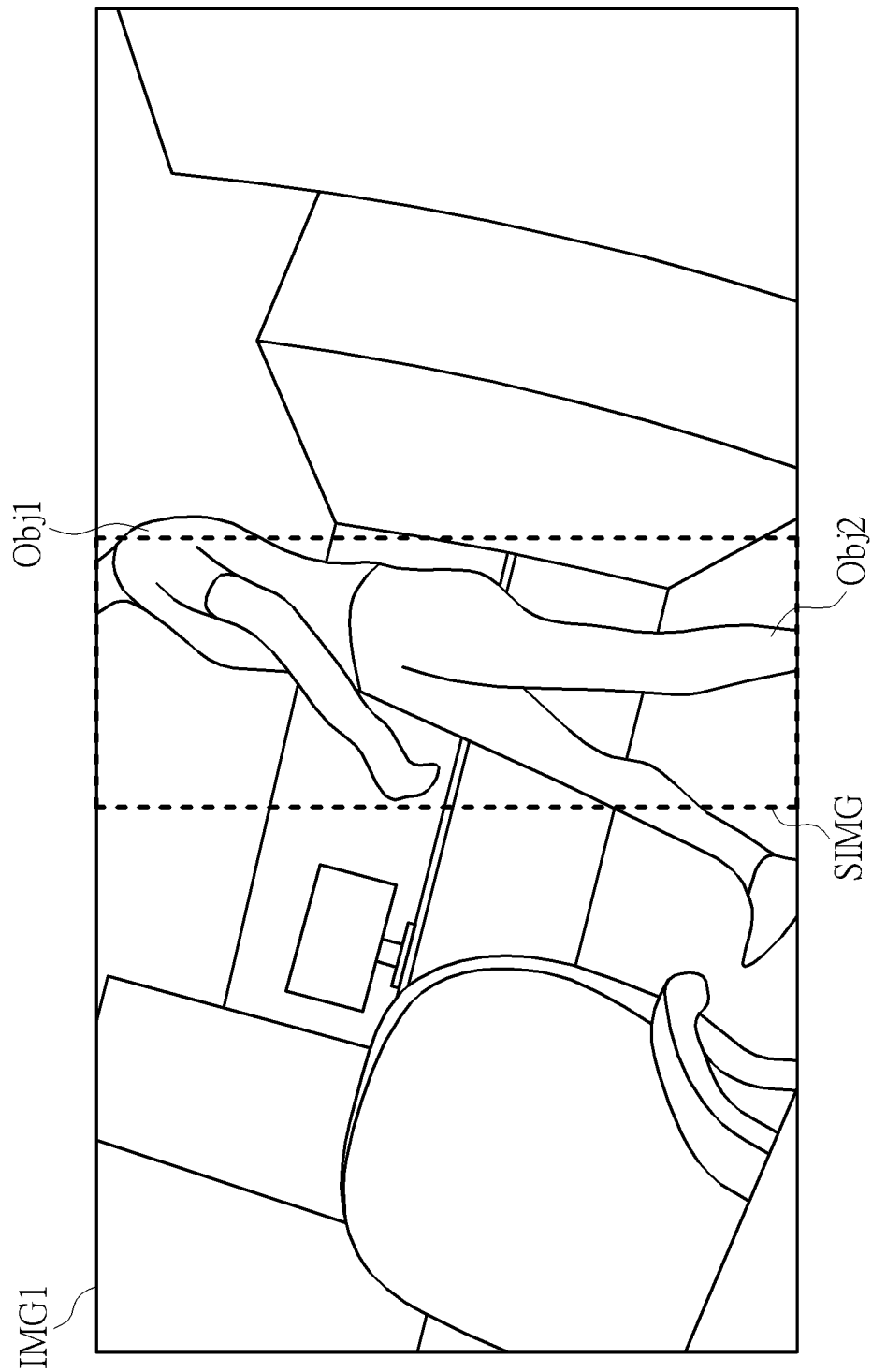
FIG. 8 is an illustration of cropping the raw image to generate a sub-image corresponding to the range of the motion object image by using the motion image integration system in FIG. 1.

FIG. 8 is an illustration of cropping the raw image IMG1 to generate a sub-image SIMG corresponding to the range of the motion object image ObjIMG3 by using the motion image integration system 100. Since the upper-left vertex C, the width W3, and the height H3 of the motion object image ObjIMG3 can be generated, the processor 13 can acquire information of the position and the range of the motion object image ObjIMG3. Then, the processor 13 can crop the raw image IMG1 to generate the sub-image SIMG according to the motion object image ObjIMG3. Initially, the first motion object Obj1 and the second motion object Obj2 are two "independent" objects. The first motion object Obj1 and the second motion object Obj2 only carry information of two image parts of the humanoid image. However, the sub-image SIMG cropped from the raw image IMG1 includes the first motion object Obj1, the second motion object Obj2, and an additional image around the first motion object Obj1 and the second motion object Obj2. In other words, additional pixel information between contours of the first motion object Obj1 and the second motion object Obj2 can be introduced to the sub-image SIMG. Therefore, in FIG. 8, since the sub-image SIMG can include sufficient humanoid image information, the identification accuracy of the processor 13 can be increased, thereby avoiding repeatedly executing unnecessary identification loops.

Figure 9:
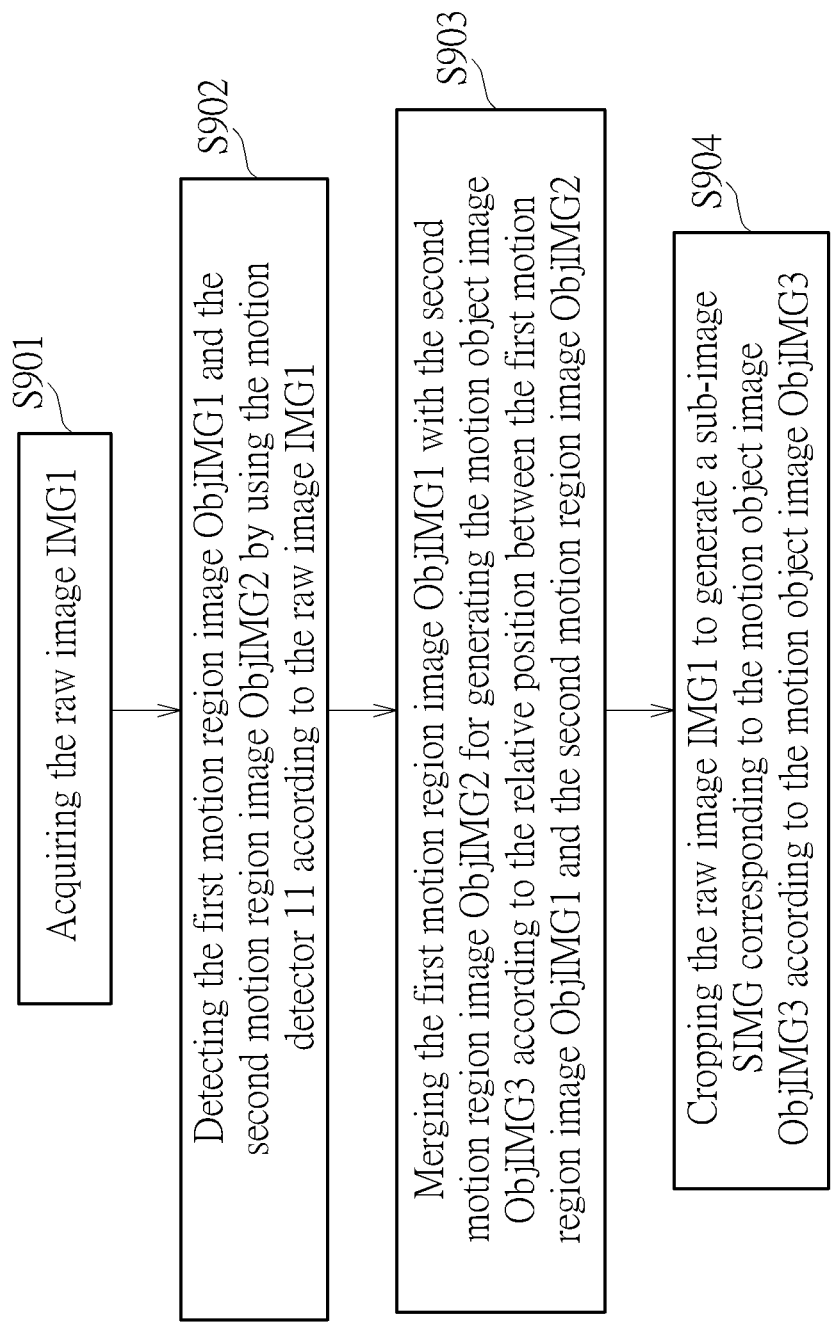
FIG. 9 is a flow chart of a motion image integration method performed by the motion image integration system in FIG. 1.

FIG. 9 is a flow chart of a motion image integration method performed by the motion image integration system 100. The motion image integration method includes step S901 to step S904. Any reasonable technology modification falls into the scope of the present invention. Step S901 to step S904 are illustrated below.

step S901: acquiring the raw image IMG1;
step S902: detecting the first motion region image ObjIMG1 and the second motion region image ObjIMG2 by using the motion detector 11 according to the raw image IMG1;
step S903: merging the first motion region image ObjIMG1 with the second motion region image ObjIMG2 for generating the motion object image ObjIMG3 according to the relative position between the first motion region image ObjIMG1 and the second motion region image ObjIMG2;
step S904: cropping the raw image IMG1 to generate a sub-image SIMG corresponding to the motion object image ObjIMG3 according to the motion object image ObjIMG3.

Details of step S901 to step S904 are previously illustrated. Thus, they are omitted here. Further, at least one additional image processing operation can be introduced to the motion image integration method. For example, the processor 13 can perform an erosion processing operation, a dilation processing operation, and/or a connected component processing operation to process a plurality of pixels corresponding to the first motion region image ObjIMG1 and the second motion region image ObjIMG2. Further, the processor 13 can adjust sizes and/or resolutions of the first motion region image ObjIMG1, the second motion region image ObjIMG2, the motion object image ObjIMG3, and/or the sub-image SIMG for optimizing the processing time and the computational complexity of the motion image integration system 100. In the motion image integration system 100, by executing step S901 to step S904, although the motion detector 11 initially detects a plurality of "incomplete" images of the motion object, the plurality of images can be integrated (or say, "merged") by introducing additional pixel information among the plurality of images. Therefore, since the sub-image SIMG generated by the motion image integration system 100 can include sufficient image information of the motion object, the motion image integration system 100 can provide high detection and identification accuracy.

Further, the processor 13 of the motion image integration system 100 can use a neural network for detecting at least one motion object. For example, the processor 13 can include a convolutional neural networks (CNN) based humanoid detector. In the image integration system 100, a user can set a detection category by the processor 13. After the detection category is set by the processor 13, the neural network of the processor 13 can be trained according to the detection category. After the neural network is trained, the processor 13 has a capability of determining if the motion object of the sub-image SIMG matches with the detection category. In other words, after information of the sub-image SIMG is received by the processor 13, the processor 13 can use the "trained" neural network for analyzing the sub-image SIMG in order to determine if the motion object of the sub-image SIMG matches with the detection category. Further, the baseline L can be adjusted according to the detection category. For example, when the detection category of the motion image integration system 100 is set as a humanoid detection, the baseline L can be set to a horizontal line of a surface. When the detection category of the motion image integration system 100 is set as a vehicular detection, the baseline L can be set to a vertical line of a surface. Any reasonable technology modification of the motion image integration system 100 falls into the scope of the present invention.

To sum up, the present disclosure illustrates a motion image integration method and a motion image integration system capable of enhancing motion detection accuracy and motion identification accuracy. The motion image integration system uses a motion detector for initially detecting motion region images from a raw image. However, the motion region images initially detected by the motion detector may only include some image parts of a motion object. In order to avoid repeatedly executing unnecessary identification loops, the motion image integration system can determine if the motion region images are merged for generating a motion object image. When the motion region images are merged, the motion object image can be generated by maximizing an amount of possible pixels (i.e., or say, maximize a selected image range) according to the motion region images. Therefore, since a sub-image cropped from the raw image according to the motion object image includes "complete" motion object information, the motion image integration system can provide the high motion detection and identification accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion image integration method comprising:
   acquiring a raw image;
   detecting a first motion region image and a second motion region image by using a motion detector according to the raw image;
   acquiring a baseline;
   acquiring a first center point of the first motion region image;
   acquiring a second center point of the second motion region image;
   acquiring a first foot of perpendicular on the baseline according to the first center point;
   acquiring a second foot of perpendicular on the baseline according to the second center point;
   determining a relative position between the first motion region image and the second motion region image according to a distance between the first foot of perpendicular and the second foot of perpendicular;
   merging the first motion region image with the second motion region image for generating a motion object image according to the relative position between the first motion region image and the second motion region image; and
   cropping the raw image to generate a sub-image corresponding to the motion object image according to the motion object image;
   wherein a range of the motion object image is greater than or equal to a total range of the first motion region image and the second motion region image, and shapes of the first motion region image, the second motion region image, and the motion object image are polygonal shapes.

2. The method of claim 1, further comprising:
   inputting the raw image to the motion detector; and
   partitioning the raw image into the first motion region image, the second motion region image, and a background image by using the motion detector;
   wherein the first motion region image and the second motion region image belong to two foreground images of the raw image.

3. The method of claim 2, wherein each foreground image has a first gray level, the background image has a second gray level, and the first gray level and the second gray level are different.

4. The method of claim 1, wherein the baseline is a horizontal line or a vertical line of a surface.

5. The method of claim 1, further comprising:
   setting a threshold; and
   comparing the threshold with the distance between the first foot of perpendicular and the second foot of perpendicular for determining if the first motion region image and the second motion region image belong to two image parts of a motion object.

6. The method of claim 5, wherein when the distance between the first foot of perpendicular and the second foot of perpendicular is smaller than the threshold, the motion object image generated by merging the first motion region image with the second motion region image comprises the motion object, and the threshold is a user-defined value associated with an aspect ratio of the raw image.

7. A motion image integration method comprising:
   acquiring a raw image;
   detecting a first motion region image and a second motion region image by using a motion detector according to the raw image;
   merging the first motion region image with the second motion region image for generating a motion object image according to the relative position between the first motion region image and the second motion region image; and
   cropping the raw image to generate a sub-image corresponding to the motion object image according to the motion object image;
   wherein a range of the motion object image is greater than or equal to a total range of the first motion region image and the second motion region image, and shapes of the first motion region image, the second motion region image, the motion object image are polygonal shapes, when a first overlapping length is present on a first axis between the first motion region image and the second motion region image, a length of the motion object image on the first axis is acquired by subtracting the first overlapping length from a total length of the first motion region image and the second motion region image on the first axis.

8. The method of claim 7, wherein when a second overlapping length is present on a second axis between the first motion region image and the second motion region image, a length of the motion object image on the second axis is acquired by subtracting the second overlapping length from a total length of the first motion region image and the second motion region image on the second axis.

9. The method of claim 1, wherein detecting the first motion region image and the second motion region image by using the motion detector, is detecting the first motion region image and the second motion region image by using the motion detector under a frame difference process or a background modeling process.

10. A motion image integration system comprising:
an image capturing device configured to acquire a raw image;
a motion detector is coupled to the image capturing device;
a memory is configured to save image data; and
a processor is coupled to the image capturing device, the motion detector, and the memory;
wherein after the motion detector receives the raw image transmitted from the image capturing device, the motion detector detects a first motion region image and a second motion region image according to the raw image, the processor acquires a baseline, acquires a first center point of the first motion region image, acquires a second center point of the second motion region image, acquires a first foot of perpendicular on the baseline according to the first center point, acquires a second foot of perpendicular on the baseline according to the second center point, and determines a relative position between the first motion region image and the second motion region image according to a distance between the first foot of perpendicular and the second foot of perpendicular, the memory saves the first motion region image and the second motion region image, the processor merges the first motion region image with the second motion region image for generating a motion object image according to the relative position between the first motion region image and the second motion region image, the processor crops the raw image to generate a sub-image corresponding to the motion object image according to the motion object image, a range of the motion object image is greater than or equal to a total range of the first motion region image and the second motion region image, and shapes of the first motion region image, the second motion region image, and the motion object image are polygonal shapes.

11. The system of claim 10, wherein after the motion detector receives the raw image transmitted from the image capturing device, the motion detector partitions the raw image into the first motion region image, the second motion region image, and a background image, and the first motion region image and the second motion region image belong to two foreground images of the raw image.

12. The system of claim 11, wherein each foreground image has a first gray level, the background image has a second gray level, and the first gray level and the second gray level are different.

13. The system of claim 10, wherein the baseline is a horizontal line or a vertical line of a surface.

14. The system of claim 10, wherein the processor sets a threshold and compares the threshold with the distance between the first foot of perpendicular and the second foot of perpendicular for determining if the first motion region image and the second motion region image belong to two image parts of a motion object.

15. The system of claim 14, wherein when the distance between the first foot of perpendicular and the second foot of perpendicular is smaller than the threshold, the motion object image generated by merging the first motion region image with the second motion region image comprises the motion object, and the threshold is a user-defined value associated with an aspect ratio of the raw image.

16. A motion image integration system comprising:
an image capturing device configured to acquire a raw image;
a motion detector is coupled to the image capturing device;
a memory is configured to save image data; and
a processor is coupled to the image capturing device, the motion detector, and the memory;
wherein after the motion detector receives the raw image transmitted from the image capturing device, the motion detector detects a first motion region image and a second motion region image according to the raw image, the memory saves the first motion region image and the second motion region image, the processor merges the first motion region image with the second motion region image for generating a motion object image according to the relative position between the first motion region image and the second motion region image, the processor crops the raw image to generate a sub-image corresponding to the motion object image according to the motion object image, a range of the motion object image is greater than or equal to a total range of the first motion region image and the second motion region image, and shapes of the first motion region image, the second motion region image, and the motion object image are polygonal shapes; and
wherein when a first overlapping length is present on a first axis between the first motion region image and the second motion region image, the processor acquires a length of the motion object image on the first axis by subtracting the first overlapping length from a total length of the first motion region image and the second motion region image on the first axis.

17. The system of claim 16, wherein when a second overlapping length is present on a second axis between the first motion region image and the second motion region image, the processor acquires a length of the motion object image on the second axis by subtracting the second overlapping length from a total length of the first motion region image and the second motion region image on the second axis.

18. The system of claim 10, wherein the motion detector uses a frame difference process or a background modeling process for detecting the first motion region image and the second motion region image.

* * * * *